US009596637B2

(12) United States Patent
Hansen et al.

(10) Patent No.: US 9,596,637 B2
(45) Date of Patent: Mar. 14, 2017

(54) DYNAMICALLY ADAPTING WIRELESS COMMUNICATION

(71) Applicant: Apple Inc., Cupertino, CA (US)

(72) Inventors: Christopher J. Hansen, Los Altos, CA (US); Kee-Bong Song, Santa Clara, CA (US); Syed A. Mujtaba, Santa Clara, CA (US); Vinay R. Majjigi, Mountain View, CA (US); Xiaowen Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 13/855,600

(22) Filed: Apr. 2, 2013

(65) Prior Publication Data

US 2014/0126397 A1 May 8, 2014

Related U.S. Application Data (60) Provisional application No. 61/722,572, filed on Nov. 5, 2012.

(51) Int. Cl.
*H04W 36/30* (2009.01)
*H04W 76/02* (2009.01)

(52) U.S. Cl.
CPC .......... *H04W 36/30* (2013.01); *H04W 76/025* (2013.01)

(58) Field of Classification Search
CPC . H04W 36/0011; H04W 36/08; H04W 36/14; H04W 36/18; H04W 36/24;
(Continued)

(56) References Cited

U.S. PATENT DOCUMENTS 6,804,532 B1 10/2004 Moon
7,653,392 B2 1/2010 Ovadia
(Continued)

FOREIGN PATENT DOCUMENTS

EP 1830518 A1 5/2007
EP 1830518 A1 * 9/2007 ............ H04W 88/06
(Continued)

OTHER PUBLICATIONS

P. A. K. Acharya, A. Sharma, E. M. Belding, K. C. Almeroth and K. Papagiannaki, "Congestion-Aware Rate Adaptation in Wireless Networks: A Measurement-Driven Approach," 2008 5th Annual IEEE Communications Society Conference on Sensor, Mesh and Ad Hoc Communications and Networks, San Francisco, CA, 2008, pp. 1-9.*
(Continued)

*Primary Examiner* — Gary Mui
*Assistant Examiner* — Stephen Steiner
(74) *Attorney, Agent, or Firm* — Sterne, Kessler, Goldstein & Fox P.L.L.C.

(57) ABSTRACT

In order to facilitate communication between an electronic device and another electronic device, the electronic device determines communication-quality metrics for a first connection in a wireless network based on received information from the other electronic device. Then, the electronic device calculates an overall communication-quality indicator for the first connection based on at least some of the communication-quality metrics. Moreover, the electronic device dynamically adapts the communication with the other electronic device based on the overall communication-quality indicator. For example, the electronic device may establish a second connection in a cellular-telephone network and may use the second connection to communicate with the other electronic device. Alternatively, the electronic device may provide the overall communication-quality indicator to
(Continued)

the other electronic device and may at least partially transition the communication from the second connection in the cellular-telephone network to the first connection in the wireless network.

21 Claims, 4 Drawing Sheets

(58) Field of Classification Search
CPC  H04W 36/30; H04W 36/0022; H04B 17/309; H04B 17/382; H04L 43/08; H04L 43/0805
USPC ............... 370/225, 235, 236, 242, 252, 332
See application file for complete search history.

(56) References Cited

U.S. PATENT DOCUMENTS

| | | | |
|---|---|---|---|
| 2004/0224637 A1* | 11/2004 | Silva et al. | 455/63.4 |
| 2006/0240828 A1* | 10/2006 | Jain et al. | 455/436 |
| 2007/0110436 A1 | 5/2007 | Bennett | |
| 2007/0253339 A1 | 11/2007 | Ovadia et al. | |
| 2008/0279154 A1 | 11/2008 | Palmer et al. | |
| 2009/0247206 A1* | 10/2009 | Yacono | 455/515 |
| 2010/0062800 A1* | 3/2010 | Gupta et al. | 455/552.1 |
| 2010/0159932 A1* | 6/2010 | Park et al. | 455/436 |
| 2011/0292914 A1* | 12/2011 | Sachs et al. | 370/332 |
| 2013/0223308 A1* | 8/2013 | Chandra | H04W 52/0229 370/311 |

FOREIGN PATENT DOCUMENTS

| | | |
|---|---|---|
| GB | 2429875 A | 7/2007 |
| WO | 2005067670 A2 | 7/2005 |
| WO | 2005086447 A1 | 9/2005 |

OTHER PUBLICATIONS

Written Opinion of the International Searching Authority with Search Report, mailed Jan. 8, 2014, directed to App. No. PCT/US2013/063412, filed Oct. 4, 2013; 10 pages.

\* cited by examiner

DYNAMICALLY ADAPTING WIRELESS COMMUNICATION

CROSS REFERENCE TO RELATED APPLICATION

This application claims priority under 35 U.S.C. §119(e) to U.S. Provisional Application Ser. No. 61/722,572, entitled "Dynamically Adapting Wireless Communication," by Christopher J Hansen, Kee-Bong Song, Syed A. Mujtaba, Vinay R. Majjigi, and Xiaowen Wang, filed on Nov. 5, 2012, the contents of which is herein incorporated by reference.

BACKGROUND

Field

The described embodiments relate to techniques for dynamically adapting wireless communication among electronic devices.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard, which is sometimes referred to as 'Wi-Fi,' or Bluetooth™ from the Bluetooth Special Interests Group of Kirkland, Wash.), and/or another type of wireless interface.

A variety of environmental conditions can adversely affect wireless communication. For example, interference from signals transmitted by proximate electronic devices and multi-path signals can significantly degrade communication quality. This degradation can cause reduced data rates.

However, not all of the communication channels among the electronic devices may be concurrently or equivalently affected. For example, a connection between two electronic devices in a wireless network (such as a Wi-Fi connection) may be adversely affected while the communication quality of a cellular-telephone network may be unaffected. Nonetheless, because communication via Wi-Fi is often essentially free (while communication via the cellular-telephone network is not), many electronic devices are designed to continue using Wi-Fi even though an improved communication alternative is available. The resulting slow and, more generally, poor communication performance degrades the user experience and is frustrating to users of electronic devices.

SUMMARY

The described embodiments include an electronic device. This electronic device includes: an antenna; an interface circuit, coupled to the antenna, that wirelessly communicates with another electronic device; a processor coupled to the interface circuit; and memory that stores a program module that is executed by the processor. The program module facilitates dynamic adaptation of communication with the other electronic device. In particular, the program module includes instructions for: receiving information from the other electronic device using a first connection in a wireless network; determining communication-quality metrics for the first connection based on the received information; calculating an overall communication-quality indicator for the first connection based on at least some of the communication-quality metrics; and dynamically adapting the communication with the other electronic device based on the overall communication-quality indicator. Note that dynamically adapting the communication involves: establishing a second connection in a cellular-telephone network and using the second connection to communicate with the other electronic device; or providing the overall communication-quality indicator to the other electronic device and at least partially transitioning the communication from the second connection in the cellular-telephone network to the first connection in the wireless network.

In some embodiments, establishing and using the second connection involves a partial handover so that communicating with the other electronic device via the second connection supplements communication with the other electronic device via the first connection. Alternatively, establishing and using the second connection may involve a full handover so that communicating with the other electronic device via the second connection replaces communication with the other electronic device via the first connection.

Moreover, the received information may include control traffic in the wireless network, and the interface circuit in the electronic device may be in a sleep mode during the receiving operation. Alternatively or additionally, the information may include data, and the interface circuit in the electronic device may be in an active mode during the receiving operation.

Furthermore, the communication-quality metrics may include: a signal strength received by the electronic device; a signal-to-noise ratio of a signal received by the electronic device; a detection rate by the electronic device of beacons from the other electronic device; a number of transmit retry bits in the received information; a transmit error rate of the electronic device received from the other electronic device; and/or a congestion factor in the wireless network.

Note that the congestion factor may be based on a channel-clear-assessment register maintained in the electronic device, a number of electronic devices in the wireless network discovered by the electronic device, and a channel utilization factor received from the other electronic device.

In some embodiments, the program module includes instructions for repeating the receiving, the determining, the calculating and the dynamic adapting operations after a time interval.

Note that the other electronic device may include an access point in the wireless network. Moreover, the wireless network may be compatible with an Institute of Electrical and Electronics Engineers (IEEE) 802.11 communication protocol.

Another embodiment provides a computer-program product for use with the electronic device. This computer-program product includes instructions for at least some of the operations performed by the electronic device.

Another embodiment provides a method for dynamically adapting communication with the other electronic device, which may be performed by the electronic device. During the method, the electronic device may perform at least some of the operations described above.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate communication between an electronic device (such as a smartphone) and another electronic device (such as an access point), the electronic device determines communication-quality metrics for a first connection in a wireless network based on received information from the other electronic device. Then, the electronic device calculates an overall communication-quality indicator for the first connection based on at least some of the communication-quality metrics. Moreover, the electronic device dynamically adapts the communication with the other electronic device based on the overall communication-quality indicator. For example, the electronic device may establish a second connection in a cellular-telephone network and may use the second connection to communicate with the other electronic device. Alternatively, the electronic device may provide the overall communication-quality indicator to the other electronic device and may at least partially transition the communication from the second connection in the cellular-telephone network to the first connection in the wireless network.

For example, the received information may be conveyed in packets that are transmitted and received by radios in the electronic devices in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface. In the discussion that follows, IEEE 802.11(such as Wi-Fi) is used as an illustrative example. In addition, the cellular-telephone network may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique.

Figure 1:
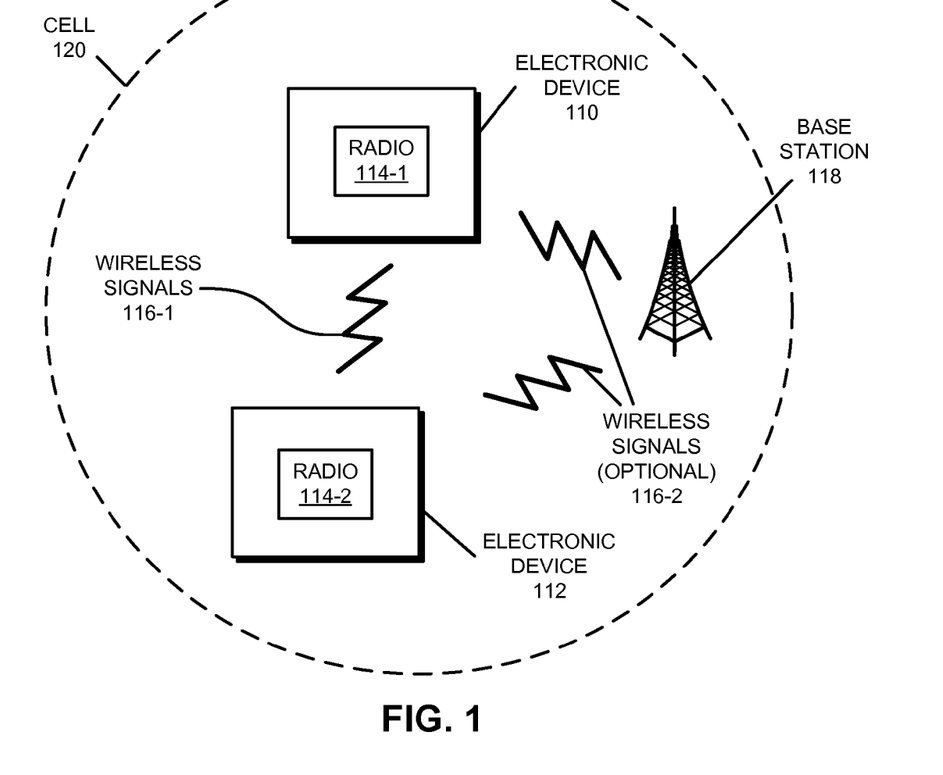
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 and 112 wirelessly communicating. In particular, these electronic devices may wirelessly communicate while: discovering one another by scanning wireless channels, transmitting and receiving advertising frames on wireless channels, establishing connections (for example, by transmitting connect requests), and/or transmitting and receiving packets (which may include the beacons, data as payloads and, more generally, information).

Figure 4:
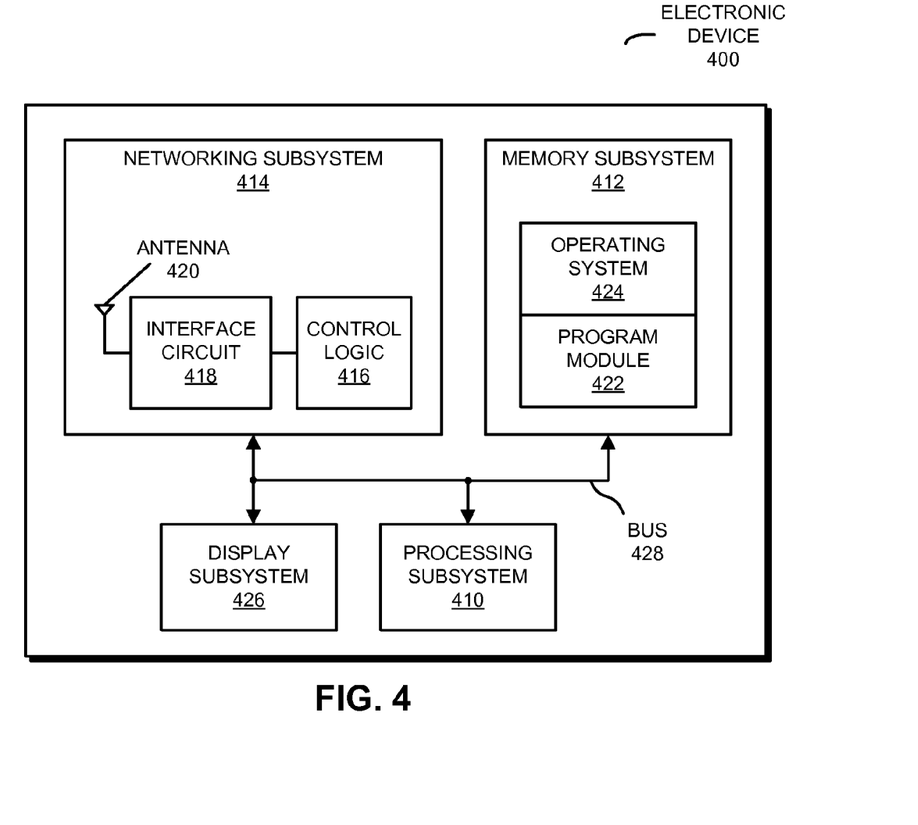
FIG. 4 is a block diagram illustrating one of the electronic devices of FIG. 1 in accordance with an embodiment of the present disclosure.

As described further below with reference to FIG. 4, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with another electronic device. This can comprise transmitting advertising frames on wireless channels to enable electronic devices to make initial contact, followed by exchanging subsequent data/management frames (such as connect requests) to establish a connection, configure security options (e.g., IPSEC), transmit and receive packets or frames via the connection, etc. In addition, electronic devices 110 and 112 may communicate with each other via a cellular-telephone network.

As can be seen in FIG. 1, wireless signals 116 (represented by jagged lines) are transmitted from one or more of radios 114 in electronic devices 110 and 112, as well as optionally by base station 118. These wireless signals are received by one or more of radios 114 in electronic devices 110 and 112 and/or by base station 118 in cell 120.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine the information contained in the packet or frame (such as a beacon, a transmit retry bit, a transmit error rate, a clear channel assessment and/or a channel utilization factor).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
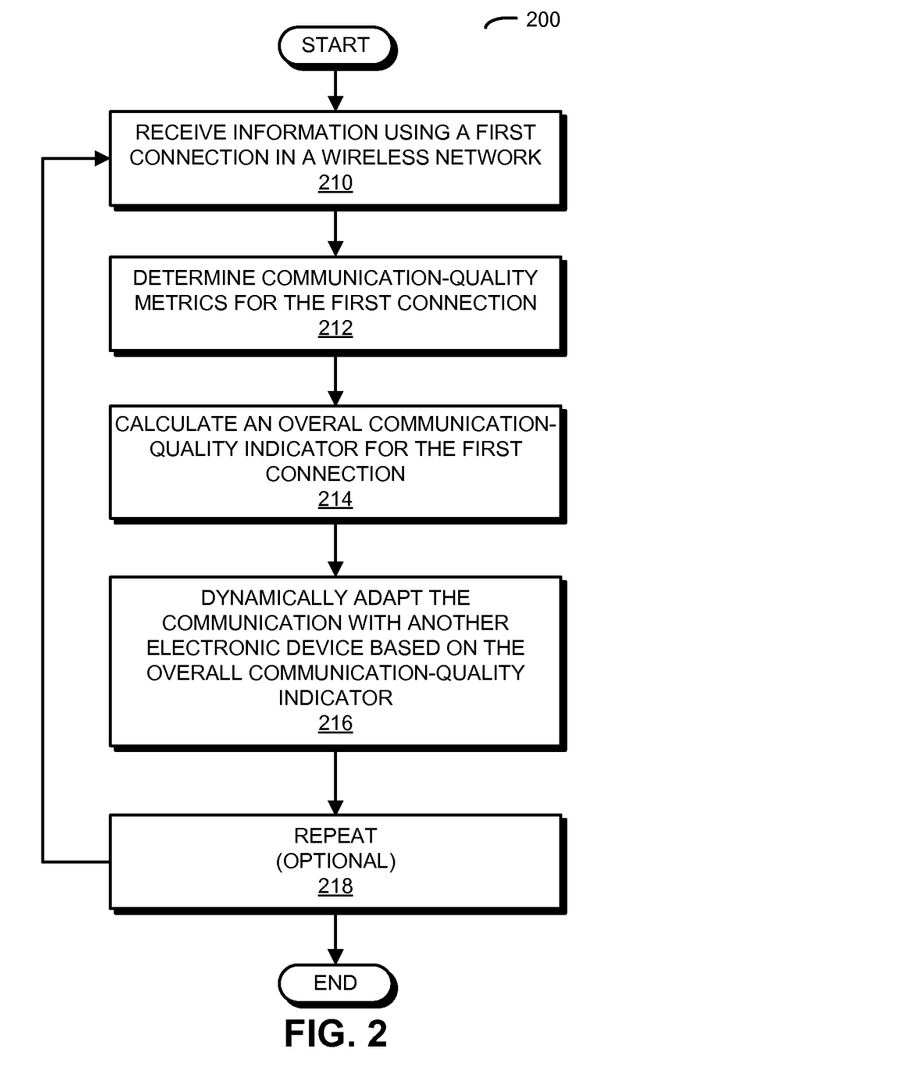
FIG. 2 is a flow diagram illustrating a method for dynamically adapting communication with one of the electronic devices in FIG. 1 in accordance with an embodiment of the present disclosure.

FIG. 2 presents a flow diagram illustrating a method 200 for dynamically adapting communication with one of electronic devices in FIG. 1, such as electronic device 110. During operation, the electronic device receives information from another electronic device (such as electronic device 112 in FIG. 1) using a first connection in a wireless network (operation 210). For example, the electronic device may include a wireless client and the other electronic device may include an access point in the wireless network. Moreover, the wireless network may be compatible with an Institute of Electrical and Electronics Engineers (IEEE) 802.11 communication protocol (such as Wi-Fi).

Then, the electronic device determines communication-quality metrics for the first connection (operation 212) based on the received information. Moreover, as described further below with reference to FIG. 3, the electronic device calculates an overall communication-quality indicator for the first connection based on at least some of the communication-quality metrics (operation 214). Next, the electronic device dynamically adapts the communication with the other electronic device based on the overall communication-quality indicator (operation 216).

Note that dynamically adapting the communication may involve establishing a second connection in a cellular-telephone network and using the second connection to communicate with the other electronic device. For example, establishing and using the second connection may involve a partial handover so that communicating with the other electronic device via the second connection supplements communication with the other electronic device via the first connection. In an exemplary embodiment, the first and the second connections each support the Transmission Control Protocol and which network is used may be dynamically selected on a per-packet basis. Alternatively, establishing and using the second connection may involve a full handover so that communicating with the other electronic device via the second connection replaces communication with the other electronic device via the first connection.

In some embodiments, the second connection already exists and is being used to communicate information between the electronic device and the other electronic device. In these embodiments, dynamically adapting the communication may involve providing the overall communication-quality indicator to the other electronic device and at least partially transitioning the communication from the second connection in the cellular-telephone network to the first connection in the wireless network.

During operation 210, the interface circuit in the electronic device (such as interface circuit 418 in FIG. 4) may be in a sleep mode or an active mode. For example, if the interface circuit is in the sleep mode, the received information may include control traffic (such as beacons) in the wireless network that is received from the other electronic device during routine wake-ups of the interface circuit. Alternatively or additionally, if the interface circuit is in the active mode, the information may include data (such as the transmit retry bits in data packets).

A variety of communication-quality metrics may be used in method 200. In particular, the communication-quality metrics may include: a signal strength received by the electronic device (such as a filtered received signal strength indicator or RSSI); a signal-to-noise ratio of the signal received by the electronic device (such as a filtered signal-to-noise ratio or SNR); a detection rate by the electronic device of beacons from the other electronic device; a number of transmit retry bits in the received information; a transmit error rate of the electronic device received from the other electronic device; and/or a congestion factor in the wireless network.

Note that the congestion factor may be based on a channel-clear-assessment (CCA) register maintained in the electronic device (which may be a number between 0 and 1 that indicates the amount of time a physical layer in the interface circuit in the electronic device does not sense a transmission from other electronic devices), a number of electronic devices in the wireless network discovered by the electronic device (such as a number of unique Media Access Control or MAC addresses decoded by the electronic device), and a channel utilization factor (CUF) received from the other electronic device. For example, the congestion factor may be a weighted average of the CCA register, the number of unique MAC addresses decoded ($N_{MAC}$) and the CUF, i.e., $$\alpha \cdot CCA + \beta \cdot N_{MAC} + \gamma \cdot \frac{CUF}{\Delta},$$

where $\alpha$, $\beta$ and $\gamma$ may each be between 0.3 and 1, the sum of $\alpha$, $\beta$ and $\gamma$ may be 1, and $\Delta$ may be a value between 5 and 10.

Furthermore, as described below with reference to FIG. 3, the overall communication-quality indicator may be calculated based on: the RSSI being less than a first threshold Th1 (such as −80 dBm); the SNR being less than a second threshold Th2 (such as −5 dB); the detection rate by the electronic device of beacons from the other electronic device being less than a third threshold Th3 (such as 20%); the number of transmit retry bits in the received information being greater than a fourth threshold Th4 (such as 10-20 transmit retry bits); the transmit error rate of the electronic device received from the other electronic device being greater than a fifth threshold Th5 (such as 50%); and/or the congestion factor in the wireless network being less than a sixth threshold Th6 (such as 0.7).

In some embodiments, the electronic device optionally repeats (operation 218) the receiving, the determining, the calculating and the dynamic adapting operations after a time interval T (such as T between 1 and 5 s).

In an exemplary embodiment, method 200 provides an indication of Wi-Fi air-interface quality based on radio information and congestion conditions. In particular, the overall communication-quality indicator may be based on some combination of the following communication-quality metrics: a low-pass filtered RSSI (which provides an indication of the downlink radio-link quality); a low-pass filtered SINR (which provides an indication of the downlink radio-link quality); the received beacon count (which provides indications of the downlink radio-link quality and the air-interface congestion); the number of transmit retry bits in received data (which provides indications of the downlink radio-link quality and the air-interface congestion); the transmit error rate (which provides indications of the uplink radio-link quality and the air-interface congestion); the CCA register (which provides an indication of air-interface congestion); $N_{MAC}$; and/or the CUF (which provides an indication of air-interface congestion).

The received beacon count (which is sometimes referred to as 'the beacon detection rate') can be used as a metric for Wi-Fi usability. It can be computed from the number of beacons received over X seconds divided by the number of expected beacons over X seconds. For example, X may be 5 and Th3 may be 20%.

Moreover, a transmit retry bit may be included in a field in each packet received from the other electronic device. This transmit retry bit can indicate that a re-transmission occurred for a given packet (i.e., it may be a '1') or that a new transmission occurred for the given packet (i.e., it may be a '0'). The number of transmit retry bits received may be initialized after Wi-Fi association (e.g., a counter value may be set to 0). If a re-transmission occurred, the number of transmit retry bits may be incremented by 1 (i.e., the counter value may be updated). Alternatively, if a new transmission occurred (i.e., a retry did not occur for the given packet), the number of transmit retry bits may be decremented (for example, the counter value may be divided by 2). Note that the counter value is non-negative and may remain unchanged if a data packet is not received.

Furthermore, the transmit error rate may be considered valid if other conditions are met. In particular, it may be valid if the number of transmit packets in a 5 s time interval is greater than 5 and if the number of transmit retransmissions is greater than 5× the number of transmit packets. As noted previously, Th5 may be 50%. These criteria may ensure that this communication-quality metric provides an accurate indication of the channel quality.

As noted previously, in general the operations in method 200 may be performed by the electronic device (such as a cellular telephone or a handset), and the other electronic device (such as an access point) may provide information that is used in determining the communication-quality metrics and/or calculating the overall communication-quality indicator. Moreover, the operations in method 200 may be performed while the interface circuit in the electronic device is in the active mode or the sleep (low-power) mode. For example, the RSSI, the SINR, the CCA register, $N_{MAC}$, and/or the CUF may be received or determined when the electronic device is in the active mode or the sleep mode. For example, in the sleep mode control traffic in the wireless network (such as beacons) may be used, while in the active mode additional information in data (such as transmission retry bits) may be used. Therefore, at least some of the communication-quality metrics may be determined when the electronic device is not transmitting data. However, the number of transmit retry bits and the transmit error rate may only be determined when the electronic device is in the active mode.

Figure 3:
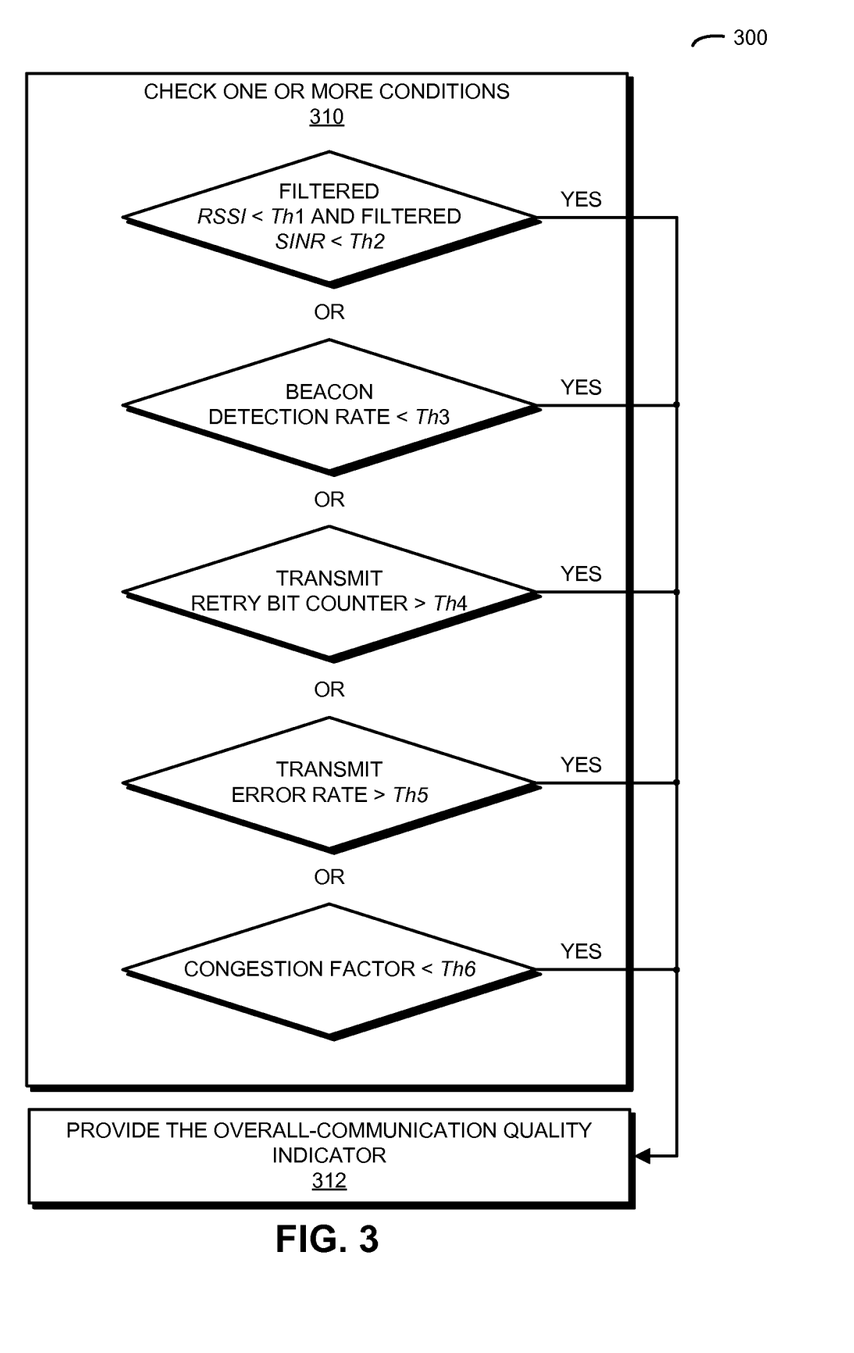
FIG. 3 is a flow diagram illustrating a method for calculating an overall communication-quality indicator for a first connection based on at least some communication-quality metrics in the method of FIG. 2 in accordance with an embodiment of the present disclosure.

FIG. 3 presents a flow diagram illustrating a method 300 for calculating an overall communication-quality indicator for the first connection based on at least some of the communication-quality metrics in method 200 (FIG. 2). In particular, providing the overall communication-quality indicator (operation 312) may assert an indication that a 'Wi-Fi link not usable' for T seconds, if one or more of the following conditions are met (operation 310): the filtered RSSI being less than Th1 and the filtered SINR being less than Th2; the beacon detection rate being less than Th3; the downlink transmit retry bit counter being greater than Th4; the transmit error rate being greater than Th5; or the congestion factor (which may be a combination of the CCA register, $N_{MAC}$ and the CUF) being less than Th6. After T seconds of the 'Wi-Fi link not usable' assertion, the electronic device may reevaluate the preceding conditions. Note that during the T seconds of 'not usable' assertion, the electronic device may continue to perform measurements and filtering.

In these ways, the electronic devices (for example, program modules in the electronic devices) may facilitate dynamic adaptation of the communication among the electronic devices. By facilitating this capability, this communication technique may be used to dynamically optimize communication, such as: establishing and/or switching from a connection in the wireless network to a connection in the cellular-telephone network; switching from an existing connection in the cellular-telephone network to the connection in the wireless network; and/or dynamically selecting the connection in the wireless network or the connection in the cellular-telephone network to convey a given packet.

In some embodiments of methods 200 (FIG. 2) and 300, there may be additional or fewer operations. Moreover, the order of the operations may be changed, and/or two or more operations may be combined into a single operation.

We now describe embodiments of the electronic device. FIG. 4 presents a block diagram illustrating an electronic device 400, such as one of electronic devices 110 and 112 in FIG. 1. This electronic device includes processing subsystem 410, memory subsystem 412, and networking subsystem 414. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program module 422), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and an antenna 420. For example, networking subsystem 414 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising frames and/or scanning for advertising frames transmitted by other electronic devices as described previously.

During operation of electronic device 400, program module 422 may be executed by processing subsystem 410. This program module may dynamically adapt the communication between electronic device 400 and one or more other electronic devices. Thus, program module 422 may perform the operations in methods 200 (FIG. 2) and/or 300 (FIG. 3).

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, the electronic device includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 400, in alternative embodiments, different components and/or subsystems may be present in electronic device 400. For example, electronic device 400 may include one or more additional processing subsystems 410, memory subsystems 412, networking subsystems 414, and/or display subsystems 426. Additionally, one or more of the subsystems may not be present in electronic device 400. Moreover, in some embodiments, electronic device 400 may include one or more additional subsystems that are not shown in FIG. 4. For example, electronic device 400 can include, but is not limited to, a data collection subsystem, an audio and/or video subsystem, an alarm subsystem, a media processing subsystem, and/or an input/output (I/O) subsystem. Also, although separate subsystems are shown in FIG. 4, in some embodiments, some or all of a given subsystem or component can be integrated into one or more of the other subsystems or component(s) in electronic device 400. For example, in some embodiments program module 422 is included in operating system 424.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as a radio. Moreover, the integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, performing filtering of the received signals, etc.)

While communication protocols compatible with the IEEE 802.11 standard and cellular-telephone standards were used as illustrative examples, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, program module 422 can be implemented in firmware in a wireless client (such as electronic device 110 in FIG. 1). Alternatively or additionally, at least a portion of the communication technique may be implemented in a physical layer in the wireless client.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna;
   an interface circuit coupled to the antenna; and
   a processor coupled to the interface circuit, wherein the processor is configured to:
   receive information from the another electronic device via a communication over a first connection in a wireless network;
   determine communication-quality metrics for the first connection based at least in part on the received information, wherein the communication-quality metrics include a congestion factor, and wherein the receiving and the determining for at least some of the communication-quality metrics are performed while the interface circuit is in a sleep mode;

calculate an overall communication-quality indicator for the first connection based at least in part on one communication-quality metric from the communication-quality metrics; and dynamically adapt the communication with the another electronic device based at least in part on the overall communication-quality indicator, wherein the processor is further configured to:

establish a second connection in a cellular-telephone network;

provide the overall communication-quality indicator to the another electronic device; and partially transition the communication from the first connection in the wireless network to the second connection in the cellular-telephone network, wherein the second connection supplements the communication with the another electronic device, and wherein the second connection persists at least until a next dynamic adaptation.

2. The electronic device of claim 1, wherein after the next dynamic adaptation, the processor is configured to use the second connection for a full handover, wherein the second connection replaces the first connection with the another electronic device.

3. The electronic device of claim 1, wherein the received information comprises control traffic information in the wireless network.

4. The electronic device of claim 1, wherein the communication-quality metrics further comprise:
a signal strength received by the electronic device; or
a signal-to-noise ratio of a signal received by the electronic device.

5. The electronic device of claim 1, wherein the congestion factor comprises a channel-clear-assessment (CCA) register value, a number of electronic devices ($N_{MAC}$) in the wireless network discovered by the electronic device, and a channel utilization factor (CUF) received from the another electronic device.

6. The electronic device of claim 1, wherein the processor is further configured to repeat the receive, the determine, and the calculate after a time interval.

7. The electronic device of claim 1, wherein the another electronic device comprises an access point in the wireless network.

8. The electronic device of claim 1, wherein the wireless network is compatible with an Institute of Electrical and Electronics Engineers (IEEE) 802.11 communication protocol.

9. A non-transitory computer-readable medium having instructions stored therein, which when executed by a computer, cause the computer to perform operations, the operations comprising:

receiving, from another electronic device using a first connection in a wireless network, information during a sleep mode;

determining a communication-quality metric for the first connection based at least in part on the received information, wherein the communication-quality metric comprises a congestion factor; and dynamically adapting a communication with the another electronic device based at least in part on the communication-quality metric, wherein the dynamically adapting comprises:

establishing a second connection in a cellular-telephone network and using the second connection to communicate with the another electronic device;

providing the communication-quality metric to the another electronic device; and partially transitioning the communication from the first connection in the wireless network to the second connection in the cellular-telephone network, wherein the second connection supplements the communication with the another electronic device, and wherein the second connection persists at least until a next dynamic adaptation.

10. The non-transitory computer-readable medium of claim 9, wherein the operations further comprise:
after the next dynamic adaptation, using the established second connection for a full handover, wherein the second connection replaces the first connection with the another electronic device.

11. The non-transitory computer-readable medium of claim 9, wherein the receiving information further comprises receiving control traffic information in the wireless network.

12. The non-transitory computer-readable medium of claim 9, wherein the communication-quality metric further comprises:
a signal strength received by the electronic device; or
a signal-to-noise ratio of a signal received by the electronic device.

13. The non-transitory computer-readable medium of claim 9, wherein the congestion factor comprises a channel-clear-assessment (CCA) register value, a number of electronic devices ($N_{MAC}$) in the wireless network discovered by the electronic device, and a channel utilization factor CUF) received from the another electronic device.

14. The non-transitory computer-readable medium of claim 9, further comprising:
repeating the receiving and the determining operations after a time interval.

15. The non-transitory computer-readable medium of claim 9, wherein the another electronic device comprises an access point in the wireless network.

16. The non-transitory computer-readable medium of claim 9, wherein the wireless network is compatible with an Institute of Electrical and Electronics Engineers (IEEE) 802.11 communication protocol.

17. A method for dynamically adapting communication with another electronic device, the method comprising:

receiving, from the another electronic device using a first connection in a wireless network, information during a sleep mode;

determining a communication-quality metric for the first connection based at least in part on the received information, wherein the communication-quality metric comprises a congestion factor based at least in part on a channel-clear-assessment (CCA) register value;

calculating an overall communication-quality indicator for the first connection based at least in part on the congestion factor; and dynamically adapting the communication with the another electronic device based at least in part on the overall communication-quality indicator, comprising:

providing the overall communication-quality indicator to the another electronic device; and partially transitioning the communication from the first connection in the wireless network to a second connection in the cellular-telephone network, wherein the second connection supplements the communication with the another electronic device, and wherein the second connection persists at least until a next dynamic adaptation.

18. The method of claim 17, wherein the congestion factor comprises a number of electronic devices ($N_{MAC}$) in the wireless network discovered by the electronic device and a channel utilization factor (CUF) received from the another electronic device.

19. The method of claim 18, wherein the congestion factor equals:

$$\alpha \cdot CCA + \beta \cdot N_{MAC} + \gamma \cdot \frac{CUF}{\Delta},$$

wherein $\alpha, \beta, \gamma$, and A are numbers.

20. The electronic device of claim 1, wherein the processor is further configured to dynamically select the wireless network or the cellular-telephone network on a per-packet basis.

21. The electronic device of claim 1, wherein the first and second connections each support a Transmission Control Protocol.

* * * * *

UNITED STATES PATENT AND TRADEMARK OFFICE
CERTIFICATE OF CORRECTION

PATENT NO. : 9,596,637 B2
APPLICATION NO. : 13/855600
DATED : March 14, 2017
INVENTOR(S) : Hansen et al.

Page 1 of 1

It is certified that error appears in the above-identified patent and that said Letters Patent is hereby corrected as shown below:

In the Claims

Claim 19, Column 13, Line 13, "and A are numbers." should read --and $\Delta$ are numbers.--.

Signed and Sealed this
Twenty-fourth Day of April, 2018

Andrei Iancu
*Director of the United States Patent and Trademark Office*